United States Patent
Nakagawa

(10) Patent No.: US 10,710,030 B2
(45) Date of Patent: Jul. 14, 2020

(54) GAS SOLUTION PRODUCTION APPARATUS

(71) Applicant: EBARA CORPORATION, Tokyo (JP)

(72) Inventor: Yoichi Nakagawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 175 days.

(21) Appl. No.: 15/982,092

(22) Filed: May 17, 2018

(65) Prior Publication Data

US 2018/0333686 A1 Nov. 22, 2018

(30) Foreign Application Priority Data

May 19, 2017 (JP) ................. 2017-099561

(51) Int. Cl.
| | | |
|---|---|---|
| *B01F 3/04* | (2006.01) | |
| *B01F 3/22* | (2006.01) | |
| *B01D 19/00* | (2006.01) | |
| *C02F 1/78* | (2006.01) | |

(52) U.S. Cl.
CPC ...... *B01F 3/04099* (2013.01); *B01D 19/0005* (2013.01); *B01D 19/0036* (2013.01); *B01D 19/0063* (2013.01); *B01D 19/0073* (2013.01); *B01F 3/2223* (2013.01); *C02F 1/78* (2013.01); *B01D 2259/45* (2013.01); *B01F 2003/04886* (2013.01)

(58) Field of Classification Search
CPC ............ B01D 19/0005; B01D 19/0036; B01D 19/0063; B01D 19/0073; B01D 2259/45; B01F 3/04099; B01F 3/2223; B01F 2003/04886; C02F 1/78

USPC ..................... 261/65, 77, DIG. 19
See application file for complete search history.

(56) References Cited

U.S. PATENT DOCUMENTS

| | | | | |
|---|---|---|---|---|
| 4,322,226 | A | * 3/1982 | Hudec | B01D 19/0078 95/266 |
| 8,276,888 | B2 | * 10/2012 | Osborn | B01F 3/0473 261/115 |
| 2001/0028120 | A1 | * 10/2001 | Hinada | B01D 53/1475 261/77 |
| 2012/0240770 | A1 | * 9/2012 | Gerner | B01D 19/0005 96/6 |
| 2013/0092087 | A1 | * 4/2013 | Bachman | A01K 5/00 119/51.01 |
| 2015/0078417 | A1 | * 3/2015 | Verdino | G01K 1/024 374/142 |
| 2017/0282132 | A1 | 10/2017 | Ozawa et al. | |

FOREIGN PATENT DOCUMENTS

JP 2016-064386 A 4/2016

\* cited by examiner

*Primary Examiner* — Charles S Bushey
(74) *Attorney, Agent, or Firm* — Pearne & Gordon LLP

(57) ABSTRACT

A gas solution production apparatus includes a gas dissolving unit that dissolves gas of a second raw material into a liquid of a first raw material to generate a mixture liquid, and a gas-liquid separation unit that subjects the liquid mixture generated by the gas dissolving unit to gas-liquid separation into a gas solution that is supplied to a use point and an exhaust gas that is discharged from an exhaust port. The gas-liquid separation unit includes a capacity variable section that changes a capacity of an internal space of the gas-liquid separation unit.

14 Claims, 7 Drawing Sheets

GAS SOLUTION PRODUCTION APPARATUS

BACKGROUND OF THE INVENTION

Field of the Invention

The present invention relates to a gas solution production apparatus that mixes a liquid of a first raw material and gas of a second raw material to produce a gas solution.

Description of the Related Art

In recent years, cleaning of products in a semiconductor device plant, a manufacturing plant of liquid crystal electronic components, and the like has become more and more advanced with complication of manufacturing processes and miniaturization of circuit patterns. For example, fine particles, metals, organic matters and the like that adhere to silicon wafers are removed by using a special liquid (called a cleaning liquid) obtained by dissolving high-purity gas or high-purity gas and a chemical in functional water (ultrapure water or the like), for example.

As a cleaning processing method, a "single-wafer processing method" that performs chemical cleaning and ultrapure water cleaning for each wafer is adopted in response to products of high-mix low-volume production, besides a "batch processing method" that repeats dipping and cleaning operations of a plurality of silicon wafers simultaneously. In the single-wafer processing method, a cleaning step time period (a cycle time) per wafer is longer, and a use amount of the cleaning liquid is larger, as compared with those in the batch processing method, so that reduction in cycle time and reduction in the use amount of the cleaning liquid are required. Currently, in order to achieve effective cleaning in a short time period and reduce the use amount of the cleaning liquid, a high-level cleaning process that switches the cleaning step in a short time period is carried out by using a plurality of functional waters and chemicals individually or simultaneously.

As the functional water, ozone water obtained by dissolving ozone gas into ultrapure water is used. Ozone water is generally produced by an ozone water production apparatus. With advancement and complication of the cleaning process, supply and stop of ozone water to the cleaning apparatus in a short time period are required, but once production of ozone water is stopped in the conventional apparatus, a fixed time period (startup time period) is required until supply of ozone water at a required ozone concentration and a required flow rate is enabled again. Therefore, in order to respond to a supply request of ozone water to the cleaning apparatus, there is proposed an ozone water production apparatus that can produce ozone water in an amount required at a use point (refer to Japanese Patent Laid-Open No. 2016-64386, for example). In the conventional ozone water production apparatus, ozone water which is supplied to the use point, and gas which is discharged from an exhaust port are separated in a gas-liquid separation tank. Further, the gas-liquid separation tank is provided with a water level sensor to measure a water level of ozone water.

Further, in recent years, a method has been studied, which adjusts a pressure and a flow rate of a gas-dissolved water which is supplied to a use point by adjusting the pressure in a gas-liquid separation tank by providing a relief valve that discharges gas in an upper part of the gas-liquid separation tank.

However, in the conventional gas solution production apparatus, a capacity of an internal space of the gas-liquid separation tank is constant. Accordingly, when the capacity of the gas-liquid separation tank is designed to be large, it is necessary to supply large amounts of liquid (ozone water) and gas into the gas-liquid separation tank to fill the internal space of the gas-liquid separation tank with the liquid (ozone water) and the gas, at the time of startup of the apparatus or the like. On the other hand, if the capacity of the gas-liquid separation tank is designed to be small, a variation in the amount of the liquid (ozone water) inside the gas-liquid separation tank cannot be allowed at the time of operation of the apparatus or the like.

The present invention is made in the light of the above described problem, and an object of the present invention is to provide a gas solution production apparatus that can change a capacity of an internal space of a gas-liquid separation unit, and can properly adjust the capacity of the internal space of the gas-liquid separation unit in accordance with a usage situation of the apparatus.

SUMMARY OF THE INVENTION

A gas solution production apparatus of the present invention includes a gas dissolving unit that dissolves gas of a second raw material into a liquid of a first raw material to generate a liquid mixture, and a gas-liquid separation unit that subjects the liquid mixture generated by the gas dissolving unit to gas-liquid separation into a gas solution that is supplied to a use point, and an exhaust gas that is discharged from an exhaust port, wherein the gas-liquid separation unit includes a capacity variable section that changes a capacity of an internal space of the gas-liquid separation unit.

According to the configuration, the capacity of the internal space of the gas-liquid separation unit can be changed by operating the capacity variable section, so that it becomes possible to properly adjust the capacity of the internal space of the gas-liquid separation unit in accordance with a usage situation of the apparatus. For example, at the time of startup of the apparatus or the like, it is necessary to fill the internal space of the gas-liquid separation unit with a liquid (gas solution) and gas (exhaust gas). In such an occasion, the capacity variable section is operated to decrease the capacity of the internal space of the gas-liquid separation unit. Thereby, only small amounts of liquid and gas are required at the time of startup of the apparatus. Further, at a time of operation of the apparatus or the like, it is desirable that the internal space of the gas-liquid separation unit has a sufficient capacity in order to stabilize the amount of gas solution (supply liquid) that is discharged from the inside of the gas-liquid separation unit and is supplied to the use point. By increasing the capacity of the internal space of the gas-liquid separation unit by operating the capacity variable section, the amount of gas inside the gas-liquid separation unit is ensured, and variation in gas pressure can be easily absorbed.

Further, in the gas solution production apparatus of the present invention, the capacity variable section is a capacity variable body that is housed in the internal space of the gas-liquid separation unit, and by supplying gas to an inside of the capacity variable body, a volume of the capacity variable body may increase, and the capacity of the internal space of the gas-liquid separation unit may decrease, whereas by discharging gas from the inside of the capacity variable body, the volume of the capacity variable body may decrease, and the capacity of the internal space of the gas-liquid separation unit may increase.

According to the configuration, the capacity of the internal space of the gas-liquid separation unit can be changed by adjusting the amount of gas inside the capacity variable body. For example, at the time of startup of the apparatus or the like, by supplying gas to the inside of the capacity variable body, the volume of the capacity variable body is increased, and the capacity of the internal space of the gas-liquid separation unit can be decreased. Further, at the time of operation of the apparatus or the like, by discharging the gas from the inside of the capacity variable body, the volume of the capacity variable body is decreased, and the capacity of the internal space of the gas-liquid separation unit can be increased.

Further, in the gas solution production apparatus of the present invention, the capacity variable section is an expansion/contraction variable structure that is provided in the gas-liquid separation unit, and by contracting the expansion/contraction variable structure, the capacity of the internal space of the gas-liquid separation unit may decrease, whereas by expanding the expansion/contraction variable structure, the capacity of the internal space of the gas-liquid separation unit may increase.

According to the configuration, by expanding and contracting the expansion/contraction variable structure, the capacity of the internal space of the gas-liquid separation unit can be changed. For example, at the time of startup of the apparatus or the like, by contracting the expansion/contraction variable structure, the capacity of the internal space of the gas-liquid separation unit can be decreased. Further, at the time of operation of the apparatus or the like, by expanding the expansion/contraction variable structure, the capacity of the internal space of the gas-liquid separation unit can be increased.

Further, in the gas solution production apparatus of the present invention, the gas-liquid separation unit may include a load measurement section that measures a load of the gas-liquid separation unit.

Further, the gas solution production apparatus of the present invention may include a liquid level calculation section that calculates a liquid level of the gas solution inside the gas-liquid separation unit, from the load of the gas-liquid separation unit, which is measured in the load measurement section.

According to the configuration, from the load of the gas-liquid separation unit, which is measured in the load measurement section, the liquid level of the liquid (gas solution) inside the gas-liquid separation unit is obtained. When the gas-liquid separation unit includes the capacity variable section, it may be difficult to accurately measure the liquid level of the liquid (gas solution) inside the gas-liquid separation unit with an ordinary liquid level sensor. For example, depending on the configuration of the capacity variable body, it can be difficult to accurately measure the liquid level of the liquid (supply liquid) inside the gas-liquid separation unit, when the capacity variable body contacts the liquid surface and the liquid level changes.

Further, when the capacity variable section is the expansion/contraction variable structure which is provided in the gas-liquid separation unit, if the liquid surface varies by vibration that occurs at the time of expansion and contraction of the expansion/contraction variable structure, it becomes difficult to accurately measure the liquid level of the liquid (gas solution) inside the gas-liquid separation unit. In such a case, the liquid level can be accurately measured by obtaining the liquid level of the liquid (gas solution) inside from the load of the gas-liquid separation unit.

According to the present invention, the capacity of the internal space of the gas-liquid separation unit can be changed, and it becomes possible to properly adjust the capacity of the internal space of the gas-liquid separation unit in accordance with the usage situation of the apparatus. Further, according to the present invention, operation (startup) of the gas solution production apparatus can be properly performed while water feeding pressure in the use point is stabilized, for example.

DETAILED DESCRIPTION OF THE PREFERRED EMBODIMENTS

Hereinafter, gas solution production apparatuses of embodiments of the present invention will be described with use of the drawings. In the present embodiments, cases of ozone water production apparatuses for use in cleaning of semiconductor devices, liquid crystal electronic components, and the like will be illustrated.

First Embodiment

Figure 1:
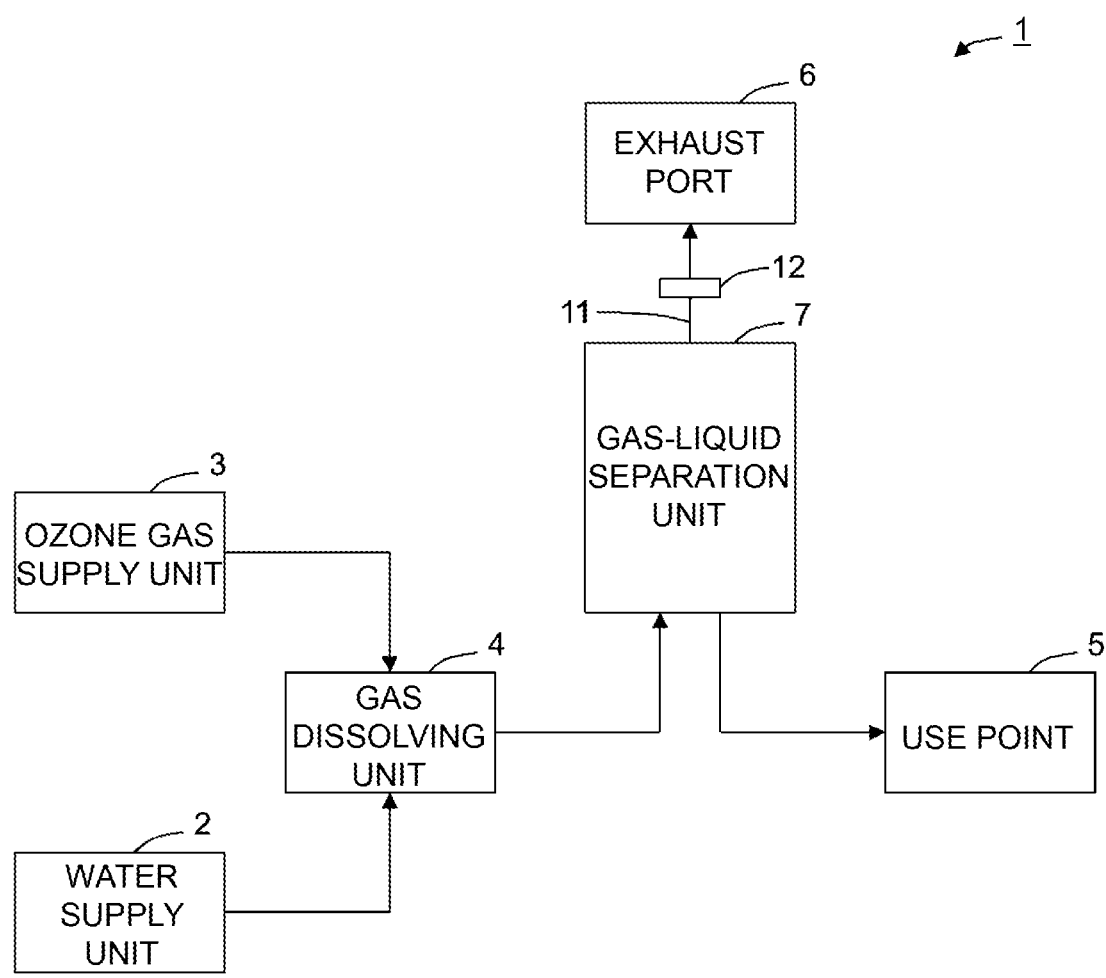
FIG. 1 is a block diagram illustrating a configuration of a gas solution production apparatus in a first embodiment.

A configuration of a gas solution production apparatus of a first embodiment of the present invention will be described with reference to the drawings. FIG. 1 is a block diagram illustrating the configuration of the gas solution production apparatus of the present embodiment. As illustrated in FIG. 1, a gas solution production apparatus 1 includes a water supply unit 2 that is a supply source of a liquid (pure water) of a first raw material, an ozone gas supply unit 3 that is a supply source of gas (ozone gas) of a second raw material, and a gas dissolving unit 4 that dissolves the gas (ozone gas) of the second raw material into the liquid (pure water) of the first raw material to generate a liquid mixture (ozone water). Further, the gas solution production apparatus 1 includes a gas-liquid separation unit 7 that subjects the liquid mixture generated by the gas dissolving unit 4 to gas-liquid separation into a gas solution (ozone water) that is supplied to a use point 5, and an exhaust gas (gas) that is discharged from an exhaust port 6. The gas-liquid separation unit 7 is configured by a tank in which fluororesin coating is applied to an inner surface, for example.

Figure 2:
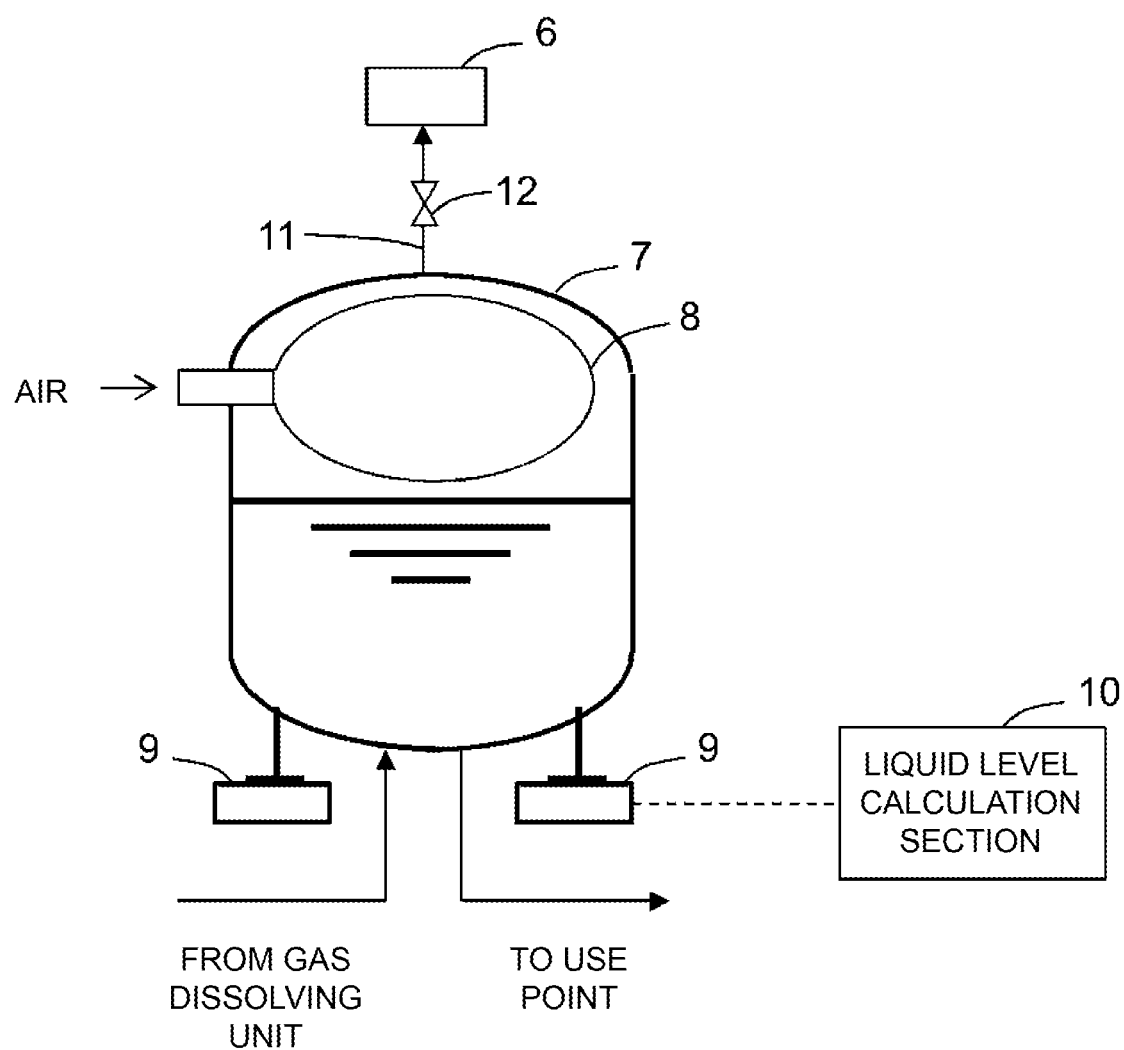
FIG. 2 is an explanatory view illustrating a gas-liquid separation unit (at a time of a capacity of an internal space decreasing) in the first embodiment.
Figure 3:
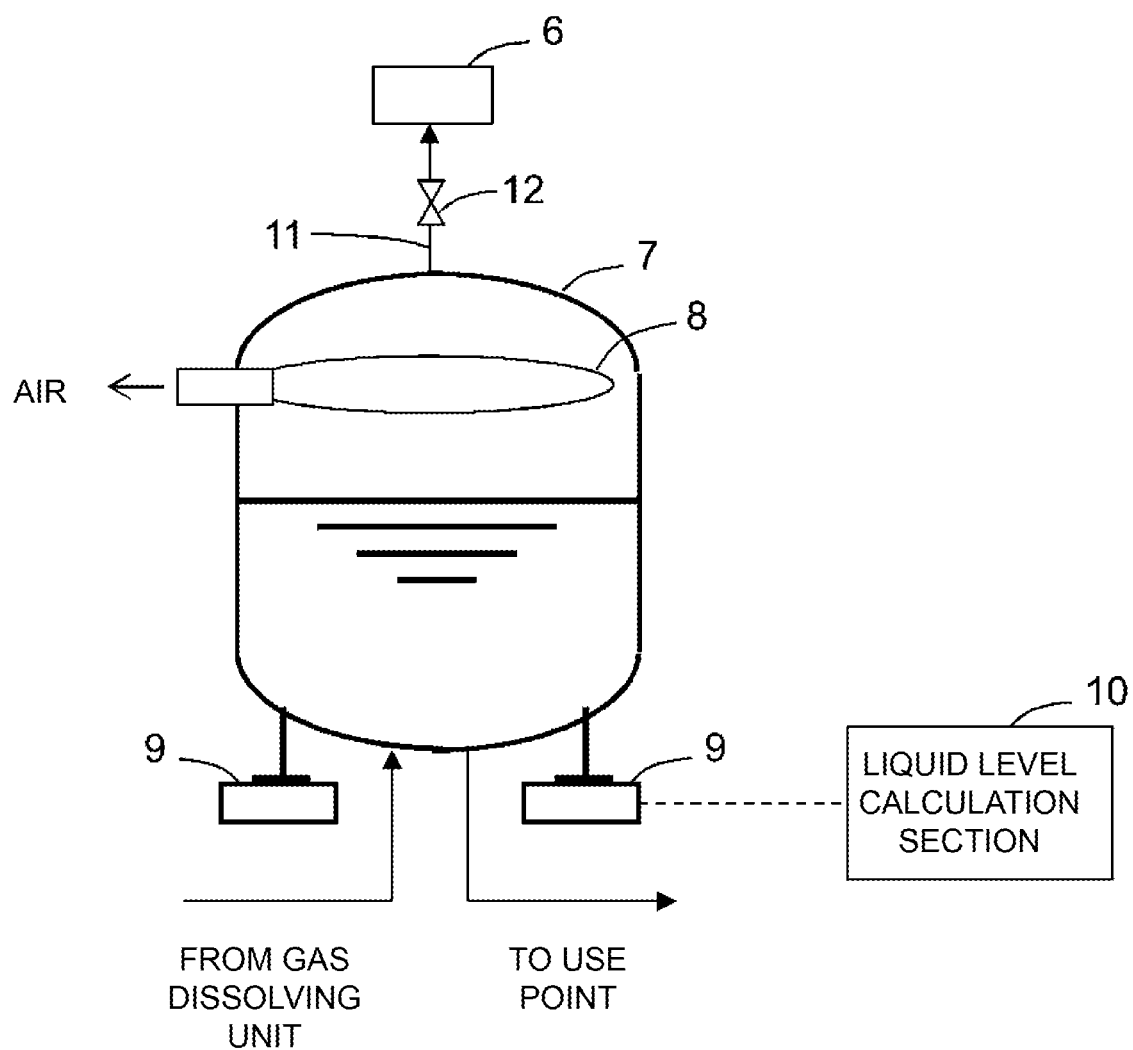
FIG. 3 is an explanatory view illustrating the gas-liquid separation unit (at a time of the capacity of the internal space increasing) in the first embodiment.

FIG. 2 and FIG. 3 are explanatory views each illustrating a configuration of the gas-liquid separation unit 7 of the present embodiment. As illustrated in FIG. 2 and FIG. 3, the gas-liquid separation unit 7 of the first embodiment includes a capacity variable body 8 that is housed in an internal space of the gas-liquid separation unit 7 as a capacity variable section that changes a capacity of the internal space of the gas-liquid separation unit 7. When gas is supplied to an inside of the capacity variable body 8, a volume of the capacity variable body 8 increases, and the capacity of the internal space of the gas-liquid separation unit 7 decreases (refer to FIG. 2). When gas is discharged from the inside of the capacity variable body 8, the volume of the capacity variable body 8 decreases, and the capacity of the internal space of the gas-liquid separation unit 7 increases (refer to FIG. 3). The capacity variable body 8 is configured by a balloon of a fluororesin, for example. Further, a relief valve 12 is preferably provided in an exhaust pipe 11 that connects the gas-liquid separation unit 7 and the exhaust port 6, and an internal pressure of an upper space of the gas-liquid separation unit 7 is configured to be adjusted by adjusting an opening degree thereof.

Further, as illustrated in FIG. 2 and FIG. 3, the gas-liquid separation unit 7 includes a load measurement section 9 that measures a load of the gas-liquid separation unit 7, and a liquid level calculation section 10 that calculates a liquid level of the gas solution inside the gas-liquid separation unit 7 from the load of the gas-liquid separation unit 7, which is measured by the load measurement section 9. The load measurement section 9 is configured by a load cell and the like, for example. The liquid level calculation section 10 calculates a liquid amount of the gas solution inside the gas-liquid separation unit 7 from the load of the gas-liquid separation unit 7, which is measured by the load measurement section 9, and calculates a liquid level from the liquid amount of the gas solution, based on structure data and design data of the gas-liquid separation unit 7, for example.

Note that in the above described example, the example of performing management with the liquid level of the gas solution inside the gas-liquid separation unit 7 is described, but management may be performed with the load of the gas-liquid separation unit 7. In that case, the gas-liquid separation unit 7 can include only the load measurement section 9, and does not always have to include the liquid level calculation section 10.

Figure 4:
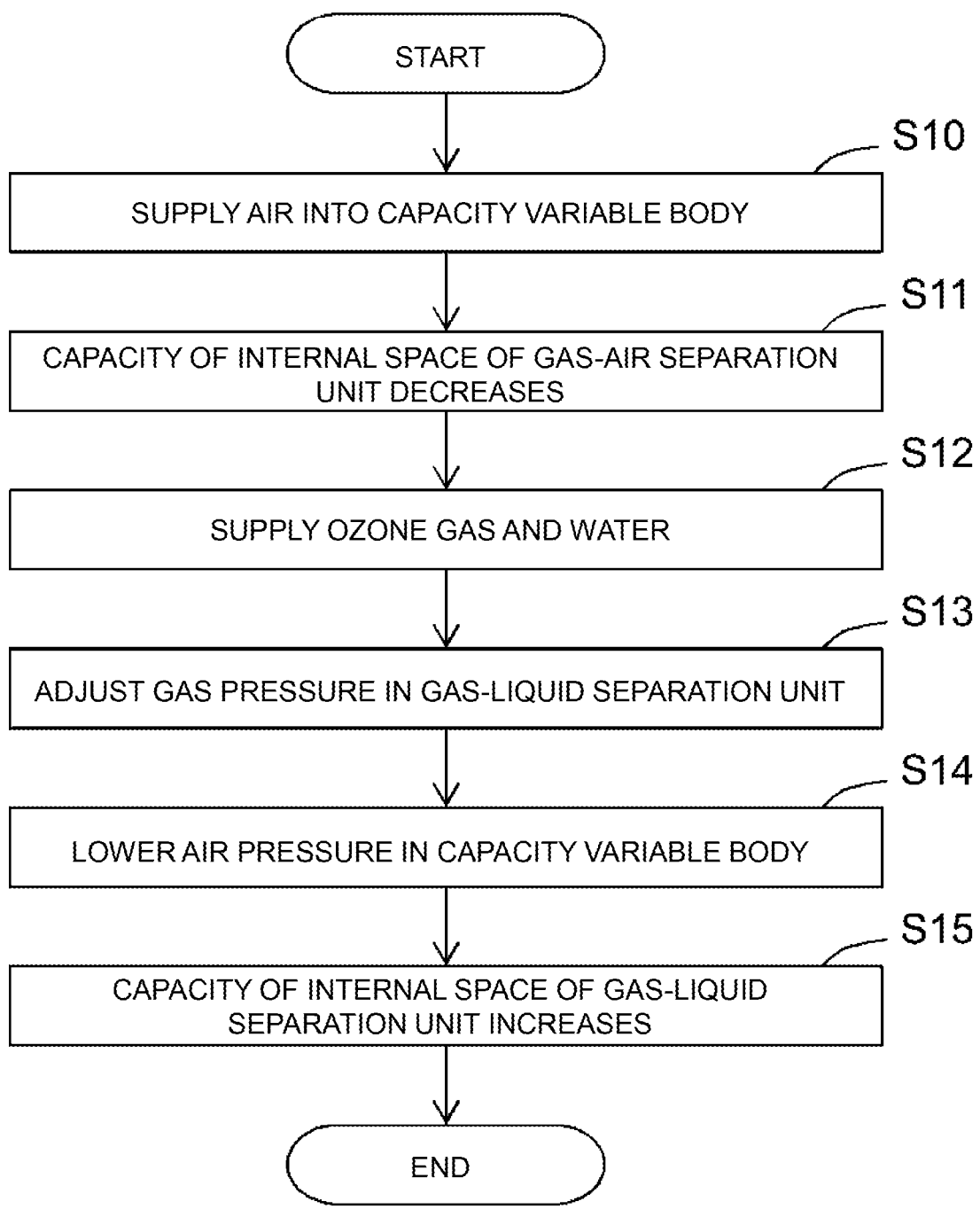
FIG. 4 is a flowchart explaining an operation at a time of startup of the apparatus in the first embodiment.

An operation of the gas solution production apparatus 1 which is configured as described above will be described with reference to the drawing. FIG. 4 is a flowchart explaining an operation at a time of startup of the gas solution production apparatus 1 of the first embodiment.

As illustrated in FIG. 4, when the gas solution production apparatus 1 is started up, air is supplied at a first pressure value (for example, 0.6 MPa) to the inside of the capacity variable body 8 first (S10) to increase the volume of the capacity variable body 8 to decrease the capacity of the internal space of the gas-liquid separation unit 7 (S11). Next, supply of the gas solution in which pure water from the water supply unit 2 and ozone gas from the ozone gas supply unit 3 are mixed in advance is started at a second pressure value (a pressure value smaller than the first pressure value, 0.3 MPa, for example), to the inside of the gas-liquid separation unit 7 (S12). When the inside of the gas-liquid separation unit 7 is filled with ozone water and gas subsequently, a gas pressure inside the gas-liquid separation unit 7 is adjusted (S13). Adjustment of the gas pressure inside the gas-liquid separation unit 7 can be performed by adjusting a supply pressure of pure water from the water supply unit 2 and a supply pressure of the ozone gas from the ozone gas supply unit 3, for example.

An ejection pressure of the gas solution which is supplied to the use point is regarded as the gas pressure inside the gas-liquid separation unit 7, so that when the gas pressure inside the gas-liquid separation unit 7 and an ozone concentration of the gas solution which is supplied to the use point reach predetermined values, it becomes possible to supply ozone water to the use point 5. Thereafter, when an air pressure inside the capacity variable body 8 is reduced to a third pressure value (a pressure value smaller than the second pressure value, 0.25 MPa, for example) in the gas solution production apparatus 1 (S14), the volume of the capacity variable body 8 decreases, and the capacity of the internal space of the gas-liquid separation unit 7 increases (S15).

According to the gas solution production apparatus 1 of the first embodiment like this, the capacity of the internal space of the gas-liquid separation unit 7 can be changed by adjusting the amount of gas (air) inside the capacity variable body 8, so that it becomes possible to properly adjust the capacity of the internal space of the gas-liquid separation unit 7 in accordance with a usage situation of the apparatus. For example, at the time of startup of the apparatus or the like, it is necessary to fill the internal space of the gas-liquid separation unit 7 with ozone water (gas solution) and gas (exhaust gas). In such an occasion, gas (air) is supplied to the inside of the capacity variable body 8 to decrease the capacity of the internal space of the gas-liquid separation unit 7 as illustrated in FIG. 2. Thereby, only small amounts of ozone water and gas are required at the time of startup of the apparatus. Further, at a time of operation of the apparatus or the like, it is desirable that the internal space of the gas-liquid separation unit 7 has a sufficient capacity in order to allow a variation in the amount of ozone water (gas solution) inside the gas-liquid separation unit 7. In such an occasion, as illustrated in FIG. 3, the variation in the amount of ozone water (gas solution) inside the gas-liquid separation unit 7 can be allowed by increasing the capacity of the internal space of the gas-liquid separation unit 7 by discharging the gas (air) from the inside of the capacity variable body 8.

Further, in the present embodiment, the liquid level of the ozone water (gas solution) inside the gas-liquid separation unit 7 is obtained from the load of the gas-liquid separation unit 7, which is measured by the load measurement section 9. When the gas-liquid separation unit 7 includes a capacity variable section, it may be difficult to accurately measure the liquid level of the ozone water (gas solution) inside the gas-liquid separation unit 7 with an ordinary liquid level sensor. For example, when the capacity variable section is the capacity variable body 8 which is housed in the internal space of the gas-liquid separation unit 7, if the ozone water (gas solution) inside the gas-liquid separation unit 7 enters into a gap between an inner circumferential surface of the gas-liquid separation unit 7 and an outer circumferential surface of the capacity variable body 8 by a capillary phenomenon or the like and the liquid level rises, it becomes difficult to accurately measure the liquid level of the ozone water (gas solution) inside the gas-liquid separation unit 7 with an ordinary liquid level sensor. In the present embodiment, the liquid level can be accurately measured in the case like this, by obtaining the liquid level of the ozone water (gas solution) inside from the load of the gas-liquid separation unit 7.

Second Embodiment

Next, the gas solution production apparatus 1 of a second embodiment of the present invention will be described. Here, a difference of the gas solution production apparatus 1 of the second embodiment from the first embodiment will be mainly described. Configurations and operations of the present embodiment are similar to those in the first embodiment, unless otherwise stated herein.

Figure 5:
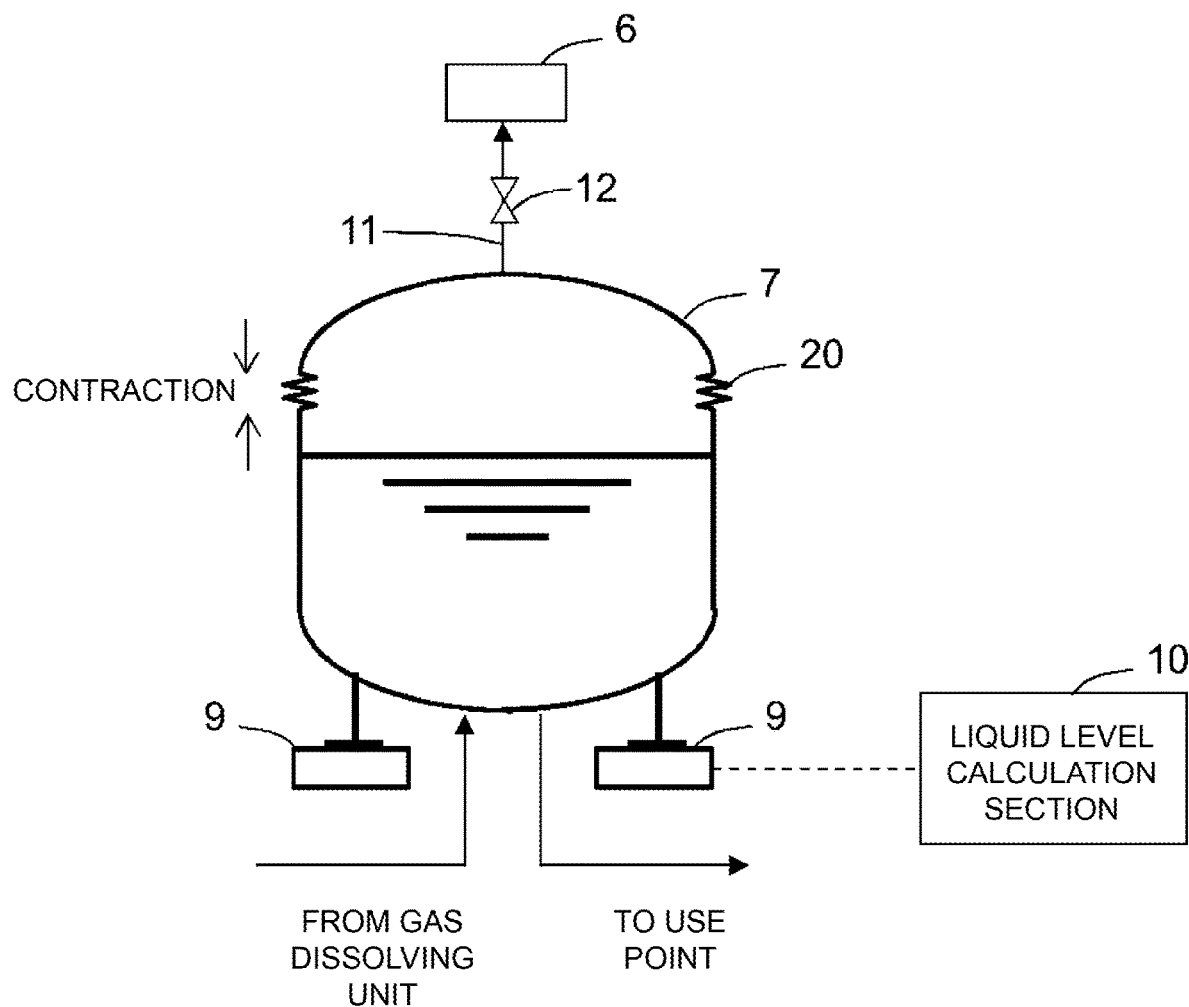
FIG. 5 is an explanatory view illustrating a gas-liquid separation unit (at a time of a capacity of an internal space decreasing) in a second embodiment.
Figure 6:
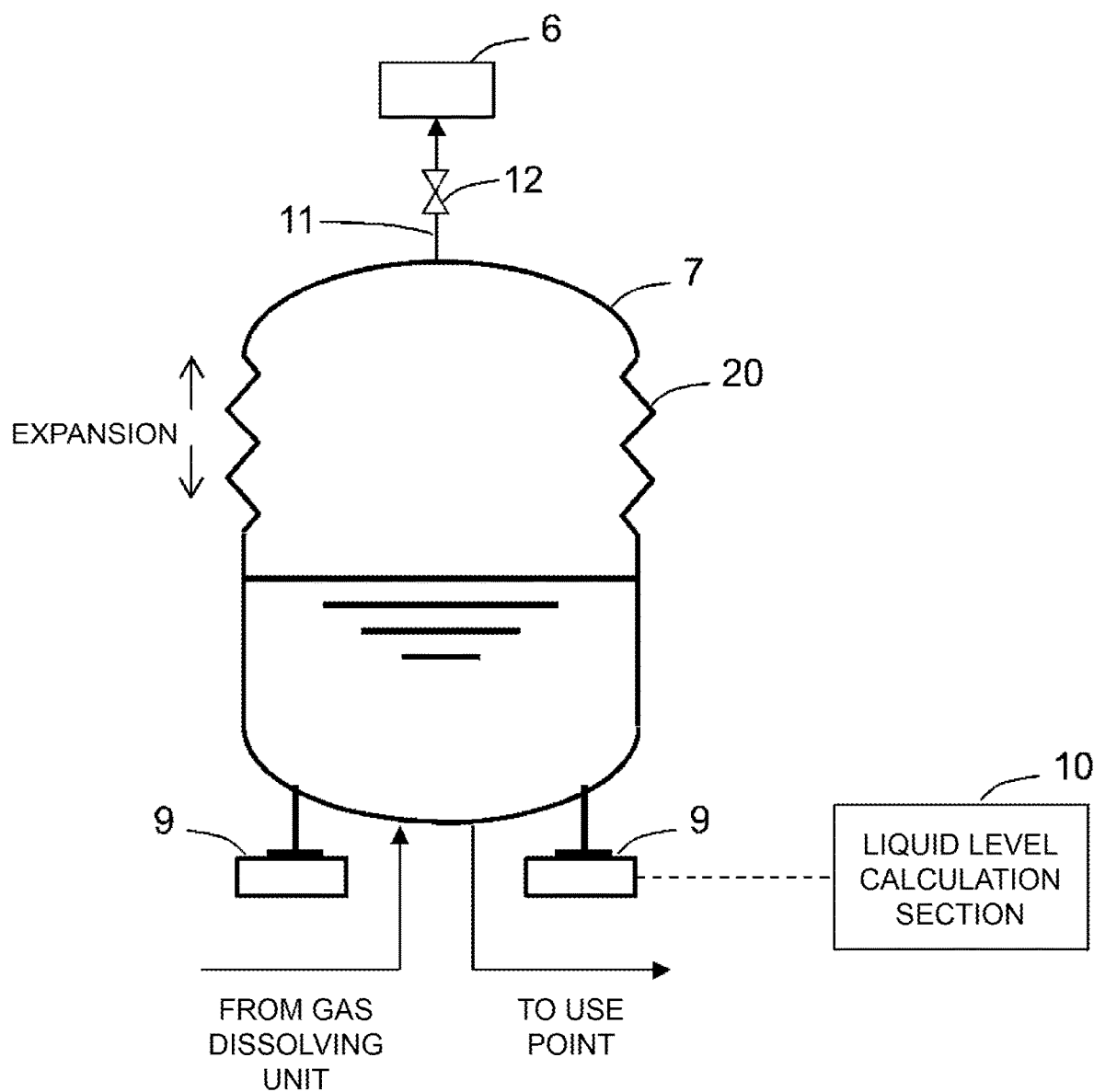
FIG. 6 is an explanatory view illustrating the gas-liquid separation unit (at a time of the capacity of the internal space increasing) in the second embodiment.

FIG. 5 and FIG. 6 are explanatory views illustrating a configuration of the gas-liquid separation unit 7 of the present embodiment. As illustrated in FIG. 5 and FIG. 6, the gas-liquid separation unit 7 of the second embodiment is provided with an expansion/contraction variable structure 20 as a capacity variable section that changes the capacity of the internal space of the gas-liquid separation unit 7. The expansion/contraction variable structure 20 is a bellows structure, for example. When the expansion/contraction variable structure 20 is contracted, a capacity of the internal space of the gas-liquid separation unit 7 decreases (refer to FIG. 5). When the expansion/contraction variable structure 20 is expanded, the capacity of the internal space of the gas-liquid separation unit 7 increases (refer to FIG. 6).

Figure 7:
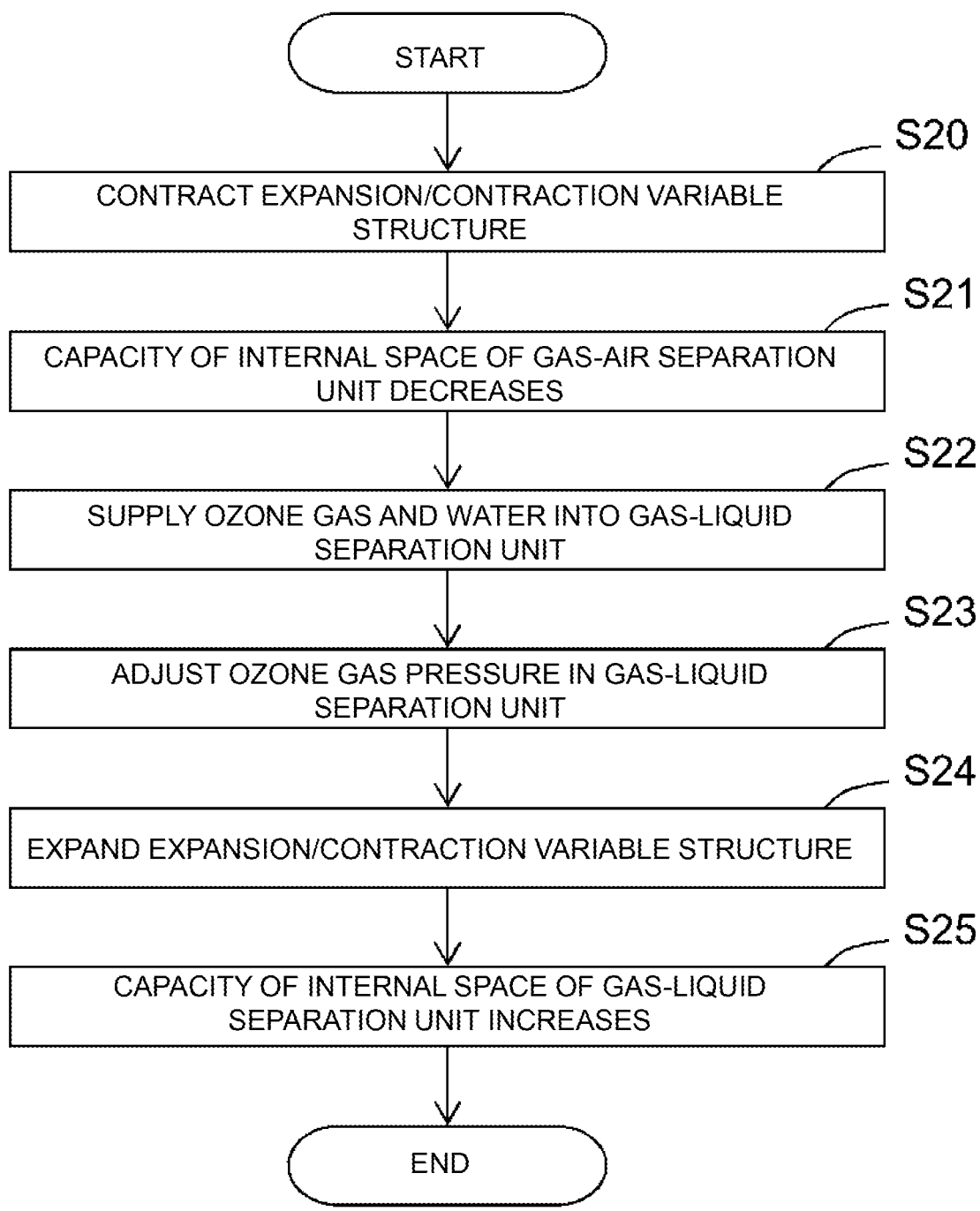
FIG. 7 is a flowchart explaining an operation at a time of startup of an apparatus in the second embodiment.

An operation of the gas solution production apparatus 1 configured as above will be described with reference to the drawing. FIG. 7 is a flowchart explaining an operation at a time of startup of the gas solution production apparatus 1 of the second embodiment.

As illustrated in FIG. 7, when the gas solution production apparatus 1 is started up, the expansion/contraction variable structure 20 is contracted first (S20) to decrease the capacity of the internal space of the gas-liquid separation unit 7 (S21). Next, supply of pure water from the water supply unit 2 and supply of ozone gas from the ozone gas supply unit 3 are started to the inside of the gas-liquid separation unit 7 (S22). When the inside of the gas-liquid separation unit 7 is filled with ozone water and gas, a gas pressure inside the gas-liquid separation unit 7 is adjusted (S23).

When adjustment of the gas pressure inside of the gas-liquid separation unit 7 is completed, it becomes possible to supply ozone water to the use point 5. Thereafter, in the gas solution production apparatus 1, the expansion/contraction structure 20 is expanded (S24), and the capacity of the internal space of the gas-liquid separation unit 7 is increased (S25).

By the gas solution production apparatus 1 of the second embodiment like this, a similar operational effect to that of the first embodiment is exhibited.

In the present embodiment, the capacity of the internal space of the gas-liquid separation unit 7 can be changed by expanding and contracting the expansion/contraction variable structure 20, so that it becomes possible to properly adjust the capacity of the internal space of the gas-liquid separation unit 7 in accordance with a usage situation of the apparatus. For example, at the time of startup of the apparatus or the like, it is necessary to fill the internal space of the gas-liquid separation unit 7 with ozone water (gas solution) and gas (exhaust gas). In such an occasion, the expansion/contraction variable structure 20 is contracted to decrease the capacity of the internal space of the gas-liquid separation unit 7 as illustrated in FIG. 5. Thereby, only small amounts of ozone water and gas are required at the time of startup of the apparatus. Further, at a time of operation of the apparatus or the like, it is desirable that the internal space of the gas-liquid separation unit 7 has a sufficient capacity in order to allow a variation in the amount of ozone water (gas solution) inside the gas-liquid separation unit 7. In such an occasion, as illustrated in FIG. 6, the variation in the amount of ozone water (gas solution) inside the gas-liquid separation unit 7 can be allowed by increasing the capacity of the internal space of the gas-liquid separation unit 7 by expanding the expansion/contraction variable structure 20.

Further, in the present embodiment, the liquid level of the ozone water (gas solution) inside the gas-liquid separation unit 7 is obtained from the load of the gas-liquid separation unit 7, which is measured in the load measurement section 9. When the gas-liquid separation unit 7 includes a capacity variable section, it may be difficult to accurately measure the liquid level of the ozone water (gas solution) inside the gas-liquid separation unit 7 with an ordinary liquid level sensor. For example, when the capacity variable section is the expansion/contraction variable structure 20 which is provided in the gas-liquid separation unit 7, if the liquid surface varies due to vibration that occurs at the time of expansion and contraction of the expansion/contraction variable structure 20, it becomes difficult to accurately measure the liquid level of the ozone water (gas solution) inside the gas-liquid separation unit 7 with an ordinary liquid level sensor. In the present embodiment, in the case like this, the liquid level can be accurately measured by obtaining the liquid level of the ozone water (supply liquid) inside from the load of the gas-liquid separation unit 7.

The embodiments of the present invention are described thus far by illustration, but the present invention is not limited to these embodiments, and can be changed and modified in accordance with an object within the range described in the claims.

For example, in the above explanation, the case where the liquid of the first raw material is pure water, and the gas of the second raw material is ozone gas is described, but the present invention can be carried out similarly by using a liquid (for example, sulfuric acid or the like) other than pure water as the liquid of the first raw material, and using gas (for example, hydrogen, nitrogen, carbon dioxide, oxygen, argon, xenon and the like) other than ozone gas as the gas of the second raw material. Alternatively, for example, in order to supply a plurality of gas solutions to one use point, a plurality of gas solution production apparatuses may be installed in one site. Thereby, in order to remove a floating metal and organic fine particles from substrates, for example, ozone-containing water and hydrogenated water can be also used in the same use point.

As above, the gas solution production apparatus according to the present invention can change the capacity of the internal space of the gas-liquid separation unit, has an effect of making it possible to properly adjust the capacity of the internal space of the gas-liquid separation unit in accordance with the usage situation of the apparatus, and is effective as the ozone water production apparatus or the like.

What is claimed is:

1. A gas solution production apparatus, comprising:
   a gas dissolving unit that dissolves gas of a second raw material into a liquid of a first raw material to generate a liquid mixture; and
   a gas-liquid separation unit that separates the liquid mixture generated by the gas dissolving unit into a gas solution that is supplied to a use point and an exhaust gas that is discharged from an exhaust port,
   wherein the gas-liquid separation unit includes a capacity variable section that changes a capacity of an internal space of the gas-liquid separation unit for receipt of the liquid mixture into the internal space.

2. The gas solution production apparatus according to claim 1,
   wherein the capacity variable section is a capacity variable body that is housed in the internal space of the gas-liquid separation unit, and
   by supplying gas to an inside of the capacity variable body, a volume of the capacity variable body increases, and the capacity of the internal space of the gas-liquid separation unit decreases, whereas by discharging gas from the inside of the capacity variable body, the volume of the capacity variable body decreases, and the capacity of the internal space of the gas-liquid separation unit increases.

3. The gas solution production apparatus according to claim 1,
wherein the capacity variable section is an expansion/contraction variable structure that is integrated with a body of the gas-liquid separation unit, and
by contracting the expansion/contraction variable structure, the capacity of the internal space of the gas-liquid separation unit decreases, whereas by expanding the expansion/contraction variable structure, the capacity of the internal space of the gas-liquid separation unit increases.

4. The gas solution production apparatus according to claim 1,
wherein the gas-liquid separation unit includes a load measurement section that measures a load of the gas-liquid separation unit.

5. The gas solution production apparatus according to claim 4,
wherein the gas-liquid separation unit includes a liquid level calculation section that calculates a liquid level of the gas solution inside the gas-liquid separation unit, from the load of the gas-liquid separation unit, which is measured by the load measurement section.

6. The gas solution production apparatus according to claim 2,
wherein the gas-liquid separation unit includes a load measurement section that measures a load of the gas-liquid separation unit.

7. The gas solution production apparatus according to claim 3,
wherein the gas-liquid separation unit includes a load measurement section that measures a load of the gas-liquid separation unit.

8. The gas solution production apparatus according to claim 1, wherein the gas dissolving unit is configured to dissolve any one or more of gaseous ozone, hydrogen, nitrogen, carbon dioxide, oxygen, argon and xenon into liquid pure water or liquid sulfuric acid.

9. The gas solution production apparatus according to claim 1, wherein the gas solution production apparatus is configured to control the capacity of the internal space to a predefined capacity by a respective measured action of or to the capacity variable section.

10. A gas solution production apparatus, comprising:
a gas-liquid separation unit including a body defining a chamber configured to receive a liquid material being a mixture of gaseous and liquid components, wherein the gas-liquid separation unit is configured to separate the received liquid material in the chamber into at least a pair of resultant gaseous materials for being separately output from the chamber; and
a capacity variable section disposed at the gas-liquid separation unit and configured to vary a maximum volume of the liquid material stored within the chamber via a respective measured action of or to the capacity variable section.

11. The gas solution production apparatus of claim 10, wherein the gas solution production apparatus is configured to determine the volume of the liquid material within the chamber according to a load of the liquid material in the chamber.

12. The gas solution production apparatus of claim 10, further comprising a gas dissolving unit configured to dissolve a first gaseous material into a first liquid material resulting in the liquid material that is received into the chamber.

13. The gas solution production apparatus of claim 10, wherein a maximum volume of the chamber is fixed.

14. The gas solution production apparatus of claim 10, wherein a maximum total volume of the chamber is variable via an action of the capacity variable section.

* * * * *